United States Patent [19]
Eder et al.

[11] Patent Number: 5,885,693
[45] Date of Patent: Mar. 23, 1999

[54] SHAPED PLASTIC FOAM PART HAVING PORTIONS OF DIFFERENT DENSITY

[75] Inventors: Bernhard Eder, Linz; Franz Reitinger, Rottenegg, both of Austria; Hans-Michael Sulzbach, Königswinter/Vinxel; Horst Klahre, Sankt Augustin, both of Germany

[73] Assignee: C.A. Greiner & Söhne Gesellschaft m.b.H., Kremsmünster, Austria

[21] Appl. No.: 874,059

[22] Filed: Jun. 12, 1997

Related U.S. Application Data

[63] Continuation of Ser. No. 346,501, Nov. 29, 1994, abandoned.

[30] Foreign Application Priority Data

Nov. 29, 1993 [AT] Austria .................................. A 2416/93
Aug. 10, 1994 [AT] Austria .................................. A 1556/94

[51] Int. Cl.[6] .................................. B32B 3/12; B32B 7/02
[52] U.S. Cl. .................. 428/160; 428/158; 428/218; 428/316.6; 264/45.3
[58] Field of Search .................. 264/45.3; 428/158, 428/160, 316.6, 218

[56] References Cited

U.S. PATENT DOCUMENTS

| | | | |
|---|---|---|---|
| 3,878,133 | 4/1975 | Rubens | 428/313.5 |
| 4,666,646 | 5/1987 | Chang . | |
| 4,874,648 | 10/1989 | Hill et al. | 156/188 |
| 5,055,339 | 10/1991 | Eder et al. . | |
| 5,135,959 | 8/1992 | Hill | 521/54 |
| 5,422,385 | 6/1995 | Farkas | 523/211 |
| 5,432,204 | 7/1995 | Farkas | 521/49 |

FOREIGN PATENT DOCUMENTS

| | | |
|---|---|---|
| 0 350 807 | 1/1990 | European Pat. Off. . |
| 486105 | 5/1992 | European Pat. Off. . |
| 496015 | 7/1992 | European Pat. Off. . |
| 55-135626 | 10/1980 | Japan . |

*Primary Examiner*—Terrel Morris
*Attorney, Agent, or Firm*—Collard & Roe, P.C.

[57] ABSTRACT

A three-dimensional shaped part comprises at least one first portion having an equal density throughout the volume thereof and comprising a plastic foam of a primary material having a cellular structure and plastic foam granules interconnected by the cellular structure of the plastic foam, and at least one second portion having an equal density throughout the volume thereof, the second portion being adjacent the first portion and comprising a plastic foam of a primary material having a cellular structure and elastically precompressed plastic foam granules interconnected by the cellular structure of the plastic foam. 70% to 90% of the volume of the shaped part is formed by the plastic foam granules, and the density of the second portion is greater than the density of the first portion.

22 Claims, 5 Drawing Sheets

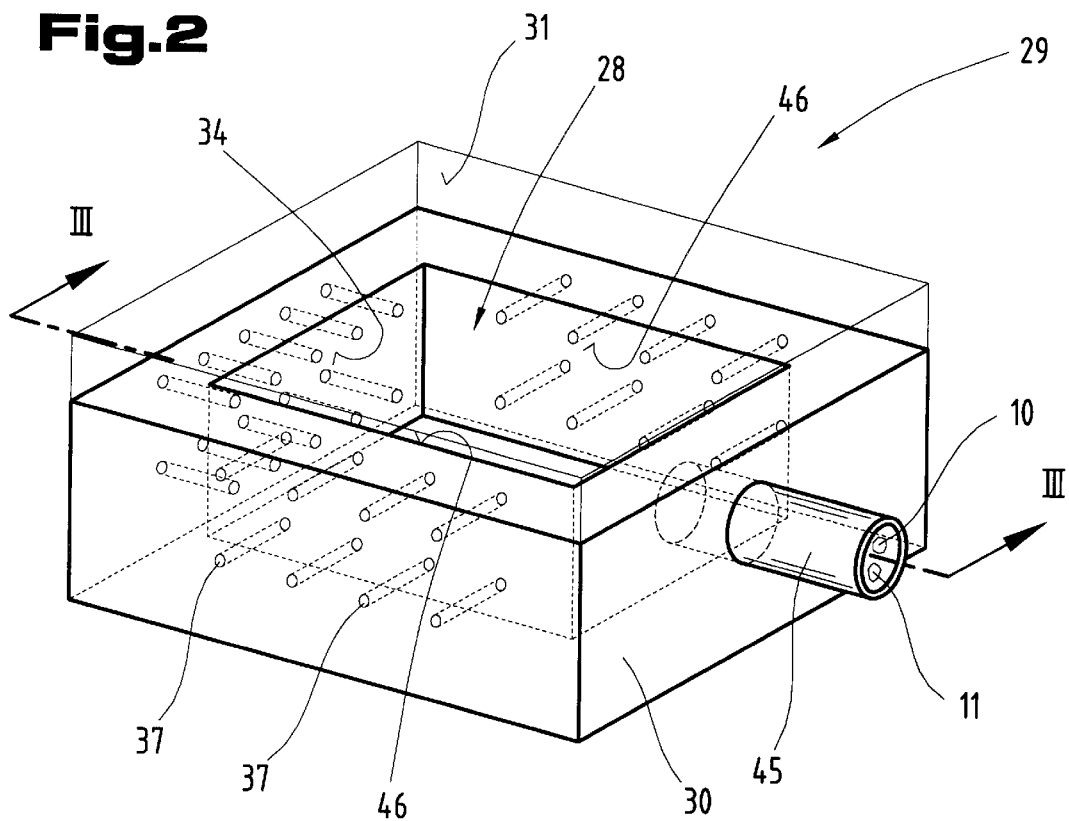
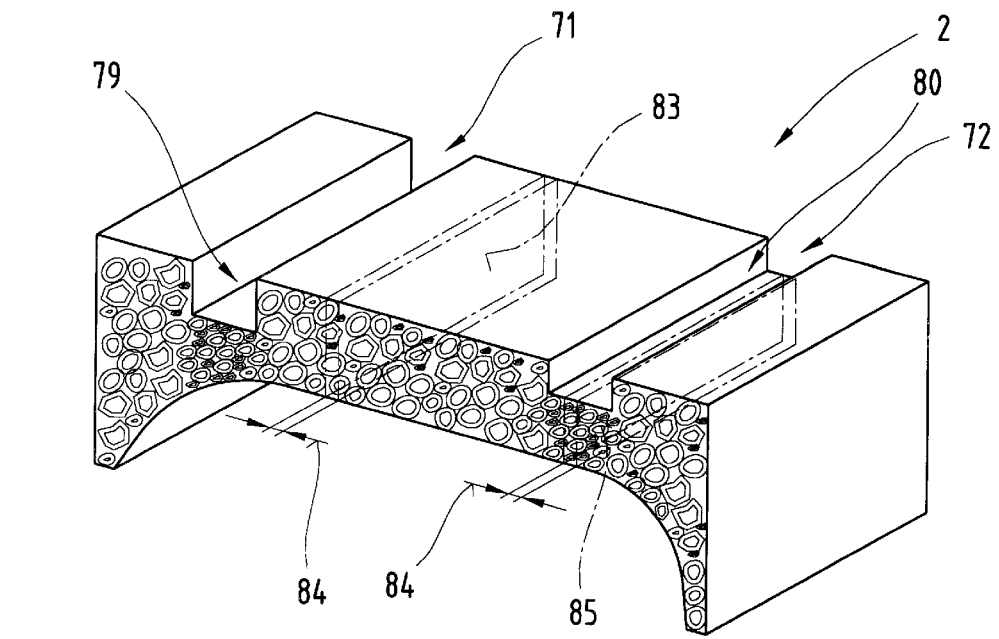

SHAPED PLASTIC FOAM PART HAVING PORTIONS OF DIFFERENT DENSITY

CROSS-REFERENCE TO RELATED APPLICATION

This is a continuation of our U.S. patent application Ser. No. 08/346,501, filed Nov. 29, 1994, now abandoned.

BACKGROUND OF THE INVENTION

1. Field of the Invention

The present invention relates to a shaped part of plastic foam granules interconnected by a cell structure of a plastic foam of primary material, in particular soft plastic foam, if required, with at least one covering layer arranged on a surface.

2. The Prior Art

Pursuant to EP-A1-0 350 807, the production of shaped parts from foamed plastic plates is already known. These foamed plastic plates consist of foamed plastic granulates of a soft foamed plastic having a grain size of between 2 mms and 20 mms, and additional filling material such as cork granulates, rubber granulates, chalk, calcium carbonate, hard polyurethane waste or thermoplastic waste plastics having a grain size of between 2 mms and 20 mms, which are foamed in dispersed form into foamed plastics made of primary material. To produce a shaped part from such a foamed plastic plate, the cellular webs and cellular walls of the plastic foam between the individual granules of the foamed plastic granulates and/or the filling material, and of course also the cellular webs and the cellular walls of foamed plastic granulates and, if necessary, the filling material, are plastically deformed in a permanent way. The deformation of the foamed plastic plates into these shaped parts occurs through the action of heat and pressure on the foamed plastic plates, which are produced by cutting up the foamed plastic block after it has been manufactured. In such shaped parts it is difficult to set the density or specific gravities in the individual areas of such a shaped part to desired values.

SUMMARY OF THE INVENTION

It is the object of the present invention to create a shaped part which allows for various different three-dimensional embodiments and a deliberate universal adaptation of the density ratios in the individual cross-sectional areas of the shaped part.

The problem of the invention is solved in that the average specific gravity can be adapted in different cross-sectional pieces to any application technology requirements. Thereby, it is advantageous that the specific gravity in the various cross-sectional pieces of the shaped part can already be adapted to the respective specific product requirements when the mould is filled , i.e. before a cross-lining or a bonding of the granules takes place by means of the foamed in plastic which consists of primary material. It is possible for example, to achieve a greater strengthening and component stiffness in the fastening region by using a larger quantity of raw material.

The object of the invention can however also be solved on its own in that the average specific gravity of the preset volume parts from different cross-sectional pieces of the shaped part referring to the intial volume, is the same, or the density of the different volume parts is only different by the compression factor of the preset compression in the respective cross-sectional piece. Thereby, it is advantageous to produce shaped parts, which, independently of their spatial deformation and the respective wall thickness in these differing regions or their thicknesses, can present any density ratio or specific gravity. Thus, it is in particular possible, independently of the the varying thicknesses or outline courses of a spatially deformed shaped part, to achieve over its entire cross-section a uniform average specific gravity with relation to a uniform volume. Moreover, it is also possible in an advantageous manner to deliberately reinforce certain areas of such a shaped element without thermal deformation or cracking by increasing the density with respect to adjacent regions.

An embodiment wherein the average specific gravity in the cross-sectional piece is preferably of between 25 kg/m$^3$ and 1000 kg/m$^3$ is also advantageous because sufficiently resistant shaped parts can be produced through the bonding of the granules by the primary-material plastic foam.

However, it is also advantageous to design a shaped part wherein the average specific gravity in the different cross-sectional pieces is the same because it is possible to achieve identical deformation and damping units over the whole shaped part.

An adaptation to different stresses is possible by the further development wherein the average specific gravity in the different cross-sectional pieces is different.

An embodiment wherein the predetermined portion of the volume is a fraction of the total volume of the shaped part, preferably smaller than 10$^{-6}$ of the volume of the shaped part enables the production of a shaped part with scarcely measurable differences in specific gravity or density. Furthermore, shaped parts produced in such a way can be used, for example by using recycling material, for example for components having very precise requirements, such as seat paddings for example, because no differences in density can be established purely by feeling.

Furthermore, an embodiment wherein a quantity and/or a weight of the granules is greater in regions of the cross-sectional piece of the shaped part, which are adjacent to each other, when referring to the same volume is also advantageous since, without thermal cracking, i.e. also in a shaped part with low specific gravity, only by the connection of the plastic material formed of raw material, it enables the production of a shaped part with zones having different density or specific gravity, which are distributed over its cross-section or its three-dimensional shape.

However, a variant of an embodiment wherein adjacent regions of a cross-sectional piece with a different density, have a different initial volume, for example initial thickness and that the region with a higher volume or a higher density at the same volume have a higher initial volume, for example an initial thickness is also possible which enables a specific supply of a larger quantity of plastic foam granules into those regions which should have a higher density. Thus, differently compacted regions of a shaped part or which have a different specific gravity, can be produced in a simple way. In particular, the production of such shaped parts having areas with differing densities or varying specific gravities will not require a further processing step, such as a compaction or cracking process, and in spite of the greater density the production of zones which are elastically resilient before and after the process, can also take place in cross-sectional areas or regions with greater density.

An embodiment wherein the shaped part is formed in one piece allows for the production of a shaped part in one operating step if in the individual areas a different density or a different specific gravity, for example a higher specific gravity is required, and adhesive layers can be saved. In addition, by a one-piece production, a shaped part can be produced from a mould which holds also appropriately well together.

However, a further development wherein in the regions of a cross-sectional piece, which are immediately adjacent to each other, the density is different at the same thickness is also advantageous, because shaped parts can be produced having different density but identical thickness, in the regions which are directly adjacent to one another, so that for example in seat paddings, the region to which the main weight of the user is applied, i.e. in the region of the backside, a higher resistance against deformation can be applied than in the directly adjacent areas, so that the paddings produced from shaped parts according to the invention can be used without modification of the construction of the seat frame.

But an embodiment wherein between 70% and 90%, preferably 85% of the volume of the shaped part is formed by granules of plastic foam is also advantageous because it allows for a cost-effective production of such shaped parts, in particular when the granules are made of waste material or recycling material. In addition, when granules of plastic foam are predominantly used, a presettable elasticity of the shaped part can be achieved whereby the latter is particularly suitable for seat paddings.

The embodiment wherein the granules of plastic foam, in particular of used or recycling material, have a specific gravity of between 20 kg/m$^3$ and 250 kg/m$^3$, preferably 50 kg/m$^3$ to 150 kg/m$^3$ allows for the production of shaped parts with a lower specific gravity, which however, have the advantage of a highly elastic resetting behaviour.

By a variant of an embodiment wherein between 10% and 20% of the weight of the shaped part consists of a synthetic material of primary material, in particular of a plastic foam the weight of the shaped part is not disadvantageously increased by the plastic material used to bond the granules among themselves and for the shaped part, since the portion of the plastic material provided for the bonding is rather small.

A sufficiently strong connection between the granules and thereby a good adhesion of the latter and a resistant shaped part, is achieved by an embodiment wherein the plastic produced from primary material has a specific gravity of between 800 kg/m$^3$ and 1200 kg/m$^3$ because the primary material having this specific gravity creates a strong holding force between the granules.

Due to the good adhesion properties the use of a primary material wherein the primary material consists of polyurethane, in particular a polyurethane foam is also advantageous.

In an embodiment wherein the primary material is formed by a soft foam, in particular a hot-moulded foam the elasticity of a shaped part can be preset at very high values.

In a further embodiment the granules of plastic foam are interconnected by a cell structure of primary material good bonding of the granules can be achieved, so that the latter cannot be easily detached from the surface of the shaped part, and on the other hand, due to the elasticity inside the individual granules, and also the elastic deformation of the cellular structure which is possible when placed under pressure, a sufficient elasticity of the shaped part can still be achieved, which allows for the use of the latter also in a region of highly stressed seats, for example in vehicles, trains, aircraft or the like.

A further development wherein the granules of plastic foam are embedded in the cell structure of the plastic foam in an elastically compressed state which, with respect to their free-rising foam volume has a smaller volume is also advantageous, whereby due to the pre-compression, an appropriate modification of the resilient properties of the granules is achieved and thereby of the elastic properties of the entire shaped part, in particular the resilience behaviour of the shaped part can thereby be adapted in a simple manner to the different requirements.

By a variant of an embodiment wherein in a more compacted region the portion of raw material or primary material, is proportionally higher with respect to the volume than in an adjacent region which is less compacted besides higher strength due to the larger number of granules, a stronger consolidation and bonding of the granules can be achieved, and thereby a zone which can be stressed to a higher degree in the more compressed region of the shaped part. Thereby, it is possible in most cases without inserting additional shaped parts or reinforcing elements to fix the shaped parts in these regions which are more compressed or to arrange for fastening means.

According to the form of an embodiment wherein the granules of plastic foam have a granulate or granules size of between 2 mm and 20 mm, preferably 5 mm to 10 mm, a partial compression or the formation of hard zones can be prevented even when the specific gravity or the density of these granules is relatively high, and moreover, the adhesion of the shaped part or its tensile strength is essentially predetermined by the cellular structure produced from the raw material, and any ripping or bursting open of the shaped part in the region of larger enclosures in the shaped part can be avoided.

A further development wherein the granules of plastic foam are held or embedded in a predeterminable three-dimensional shape in the cell structure of the synthetic material of the raw material, makes it possible to produce shaped parts with any different three-dimensional shape in one operating step without the requirement of thermal cracking or a pressing process.

A further strengthening of the shaped part or a correspondingly beautiful surface design is achieved by a further development wherein with the granules of the plastic foam in the region of a surface of the shaped pan by means of the synthetic material of the raw material, a covering layer is connected by way of a forming on process, whereby during this kind of production of the shaped part, in spite of the application of a covering layer, a high damping diffusion is possible throughout the shaped part, and no separate adhesive layer is required in order to fix the covering layer.

However, a further embodiment wherein the granules of the shaped part have a different hardness, for example hard or medium hard, is also advantageous, since, especiailly when the different hard granules are added in an appropriate dosage to the shaped part, the strengthening properties of such a shaped part can be widely varied.

The use of materials wherein the granules consist of cold and/or hot-moulded foam wastes and/or soft foam wastes, in particular polyurethane is advantageous because a reuse of the various different materials in a mixed form is made possible.

Due to the use of granules of materials wherein the granules are formed of soft foam wastes with coatings, in particular textiles or foils, or by polyurethane composite wastes, a high elasticity of the shaped parts can also be achieved if the granules are coated with textiles and/or foils.

A structure of a shaped part which is secure with respect to height can be achieved if the granules are produced from cork and/or rubber or, if a portion of these materials is added to the various soft foams or medium hard foams, it is possible to adapt a hardness of a shaped part to various purposes of use, such as noise damping or panelling elements in motor vehicles or the like.

A further development wherein to the granules, thermoplastic wastes and/or natural and/or synthetic fibres with different lengths are added in a predetermined quantity, makes it possible by adding a small portion of such materials to vary the specific gravity of the shaped parts in a simple manner, whereby by adding natural and/or synthetic fibres an even better connection in the various regions of the shaped part can be achieved, since these fibres can be used as a kind of tension bands and for a larger-surface connection of zones in the shaped part that are further spaced apart from one another.

An adaptation with respect to strength of the shaped part, to various sitting parts is made possible by an embodiment wherein inside the shaped part and/or in the region of its surfaces, reinforcement elements, for example plates, foils, lattices, nets, fabric of synthetic or natural materials, in particular metal, graphite, glass or the like, are arranged and are embedded in the granules or in the filling materials.

In a method for the production of a shaped part of granules of foamed plastic, in particular a recycling plastic foam in the granules of recycling plastic are mixed in a predeterminable range of sizes and/or with different hardnesses in a predeterminable mixing ratio, whereupon the granules of plastic foam are mixed with a liquid raw material of a synthetic material and are coated on their surface, and then are fed into the mould and are bonded to a continuous cell structure.

This method is characterized in that the presettable quantity or mass of granules of synthetic material and/or filling materials which are mixed with the raw material under a predeterminable pressure, is blown into a mould cavity which is closed from all sides and provided with ventilation openings for the flowing out of a gaseous media, and said mould cavity being filled with the granules and/or filling materials, whereby under the application of pressure and/or temperature and/or water vapour, the reaction of the raw material is triggered, in particular the plastic foam is produced and that, if required, after a drying process the shaped part is taken out of the mould cavity. This method is advantageous because when the material for the production of the shaped part, in particular granules of different plastics or filling materials, is introduced into a closed cavity, it leads to an evenly compressed filling due to the introduction by an air stream and thereby to a tight uniform embedding of the materials which are introduced approximately by floating within the air stream. Thereby, the shaped parts have a uniform density over their entire cross-sectional area. Thus, it is also possible to fill mould cavities with different spatial designs or different thicknesses, widths or lengths with an identical quantity of granules or filling materials having an approximately identical density. Thereby, shaped parts with properties, such as noise damping properties or strengthening values, which are approximately identical over their entire cross-section, can be achieved. This was not always possible up until now when granules and filling materials were placed or poured into an open mould because it led to an uneven displacement of granules mass and filling materials.

By features wherein the volume of the mould cavity after it has been filled with granules and/or filling material, is reduced in the partial regions of the mould cavity and wherein the reaction of the raw material is triggered thereafter, it is further possible without subsequent thermal deformation or other pressure or heat treatment to produce shaped parts, which, seen across their cross-section are produced from the same base material with differently tight or strong areas. Thereby, also at densities which cannot be achieved anymore when blowing in the granules and filling materials during introduction, by compressing loose or non-connected granules or filling materials, a higher specific gravity can be achieved, if required, also over the entire three-dimensional shape of the shaped part, and there is virtually no effect on the connecting structure of the granules and filling material in a disadvantageous manner since the construction of the cell structure holding the individual granules and filling materials together, or connecting them to one another, is only occurring during the final phase of the compressed form. Thus, by applying such a method it is possible to produce shaped parts with this type of granules which are tightly linked and which can be more stressed.

BRIEF DESCRIPTION OF THE DRAWINGS

Hereinafter, the invention will be explained in further detail, by way of example only, of the accompanying drawings, in which:

FIG. 2 shows a mould for the production of a shaped part, in a simplified, diagrammatic representation;

FIG. 9 shows a shaped part in accordance with the invention according to FIGS. 7 and 8 in a cross sectional perspective view.

DETAILED DESCRIPTION OF PREFERRED EMBODIMENTS

Figure 1:
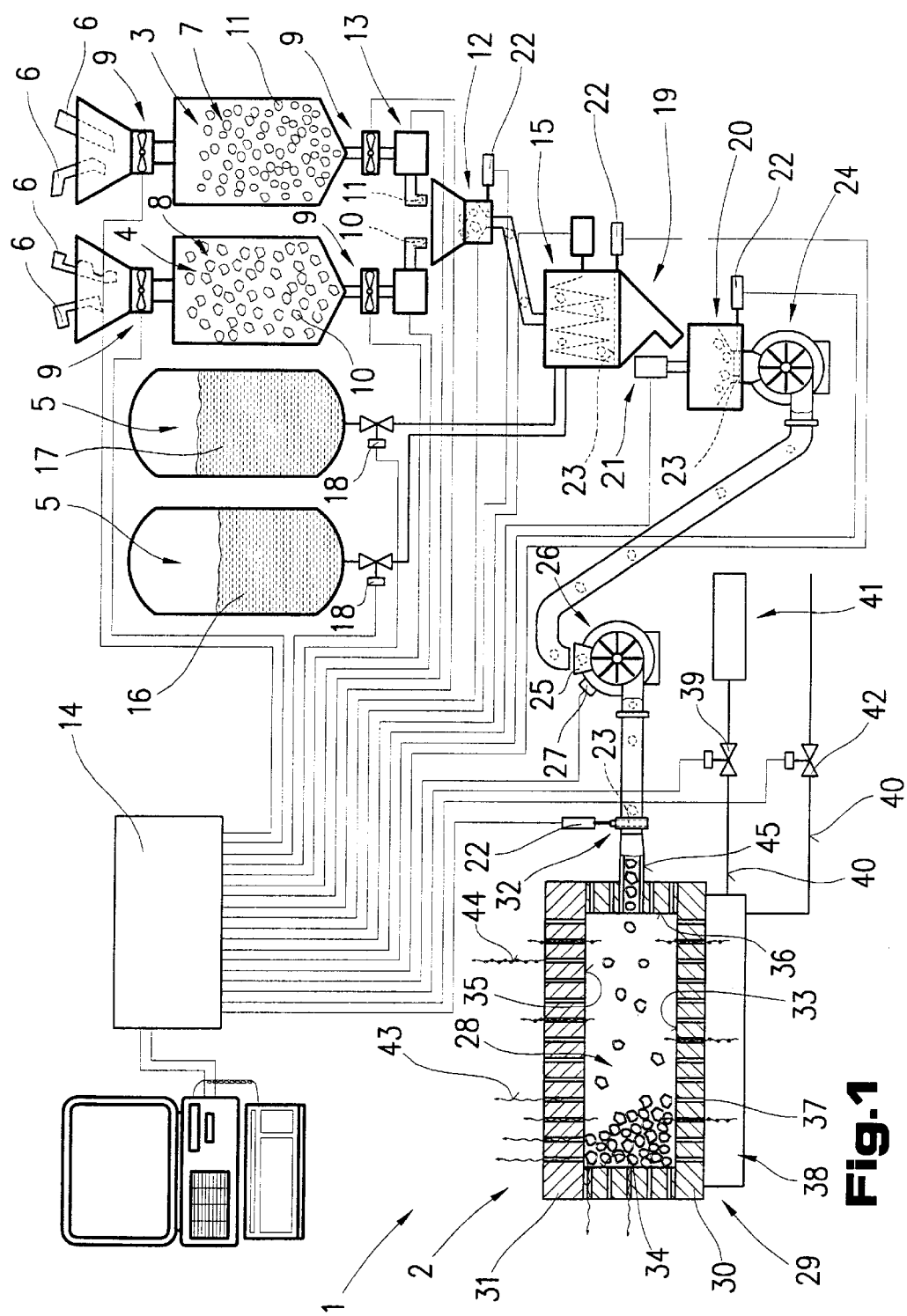
FIG. 1 shows an installation for the production of a shaped part according to the invention, in a simplified, diagrammatic representation.

FIG. 1 shows an installation I for the production of shaped parts 2. Said installation comprises several receptacles 3, 4 and a receiving tank 5 for different parts 6 of foamed plastic 7, 8, preferably also waste from foamed plastics for recyling.

The parts 6 contained in the individual receptacles 3, 4 may consist of differently cured plastic foams or plastic foam with or without coatings or covering layers or the like, for example. The materials used can be preferably individual or in any presettable ratios of PUR (polyurethane) soft foam waste materials, PUR cold and/or hot foam mould wastes, PUR-soft foam waste material coated or textile- and/or foil-backed, PUR-composite foam waste material, but also rubber or cork granulates. Here, it is possible that in addition, thermoplastic waste and/or natural and/or synthetic fibres of different length are added to the above mentioned materials in order to produce the shaped parts 2. If waste of foamed plastics is provided, it may originate from production waste, or parts 6 may of course also consist of already used, disassembled parts of synthetic material foams. It is, of course, also possible to reduce plastic foams of primary material, i.e. plastic foams which have been produced particularly for this purpose, to the appropriate granulate size.

It is of course also possible that larger parts are contained in these receptacles 3, 4, as they occur for example when cutting shaped parts, such as paddings, matresses, noise damping elements or panelling elements used in the car industry, so that these parts of synthetic material or plastic foams 7, 8 which are to be recycling, are torn up, cut or somehow otherwise reduced to a preset granulate size of between 3 mms and 20 mms, preferably 5 mms to 10 mms, before they are stored in the receptacles 3, 4.

Generally, the parts 6 are reduced to the desired granulate or granules size before they are stored in the receptacles 3, 4, by means of reduction devices 9, for example a willowing machine, a cutter or disintegrator, a mill or the like, so that the granules 10, 11 of various plastics or plastic foams 7, 8 are already in the receptacles 3, 4. If, instead of them however, parts 6 in their respective size are in the receptacles 3, 4, a willowing machine, a cutter or disintegrator or the like may be located downstream of these receptacles 3, 4, as schematically indicated. The granules 10, 11 are then transported from the receptacles 3, 4 in a portion corresponding to the respective mixing ratio, for example by means of pneumatic conveyance to a weighing tank 12. The regulation of the amounts of individual granules 10, 11 can take place by control valves 13, which are monitored and activated by a central control system 14.

The premixed charge of waste or granules 10, 11 of new material or other materials, which, if required, can be arranged in their own additional receptacles 3, 4 which are not shown, is then for example mixed by a pneumatic conveyance of a mixing device 15, for example is supplied to a rotary mixer, in which it is mixed with a liquid raw material 16 or 17 such as a polyalcohol and an isocyanate, which is supplied in quantities regulated by means of control valves 18 depending on the control system 14.

If the raw materials 16, 17 which are supplied by the receiving tanks 5 are suffiently mixed with the granules 10, 11 in the mixing device 15, or the mixture is so good that these granules 10, 11 are essentially coated continuously over their entire surface with this liquid raw material, the granules 10, 11 which are coated with the liquid raw material of the synthetic material or foamed plastic, are brought to an intermediate storage tank 20 by means of a conveyor 19, for example with a blower or a spiral conveyor. This intermediate storage tank 20 can be constructed as a weighing tank 12, that is to say, to determine the weight it can be connected with a measuring device, which is generally also connected with the control system 14 downstream of which a weighing device 21 is arranged. The conveyor 19 of the mixing device 15, which for example is indicated only schematically, can consist of a feed screw but also of a gravity conveyance, for example a stopper 23 which is adjustable by means of an adjusting device 22 in the outlet region of the mixing device 15 which feeds the granules 10, 11 which are mixed with the raw material 16, 17 into the intermediate storage tank 20.

In this intermediate storage tank 20, a mixed quantity is preferably filled in, which is enough to produce the greatest shaped part with this installation. But also any multiple of this quantity can be stored in the intermediate storage tank 20.

Depending on the desired weight of the parts by using the corresponding conveyer 19 or the stopper 23 which is adjustable by the adjusting device 22, a quantity of granules 10, 11 mixed with the raw material 16, 17 can be fed from this intermediate storage tank 20 to the weighing device 21 arranged downstream of the intermediate storage tank 20, which is generally 3–15%, preferably of between 5 and 10% above the final weight of the parts of a shaped part to be produced. The supply of the mixture from the intermediate storage tank 20 into the weighing device 21 is also monitored by a schematically indicated measuring device which transfers the data to the control system 14, and the conveyance of the mixture from the intermediate storage tank 20 is interrupted when the predetermined weight is reached.

From the weighing device 21 it is possible to approach the adjustment drive 22, for example by a pneumatic cylinder-piston arrangement or an electric stepping motor or the like via a corresponding control by means of the control system 14 in order to move the stopper 23. Taking into account the reduced weight—which is reduced in the weighing device 21 by conveyance and monitored by the measuring device—of the mixture of granules 10, 11 coated with raw material 16, 17, the conveyance, by means of a conveyer 24 arranged downstream of said weighing device, is continued to such a point until a quantity of the mixture corresponding to the predetermined weight required for the production of the shaped part is removed from the weighing device 21.

The conveyer 24 located downstream which transfers the mixture of granules 10, 11 formed of raw material 16, 17 to a receiving hopper 25 of a conveying blower 26 arranged downstream thereof, can be formed by a spiral conveyer or a blowing conveyer. A drive 27 of the conveying blower 26 is also controlled by the control system 14.

After a further stopper 23 located downstream of the conveying blower 26 and activated by the control system 14, or an adjustment drive 22 connected to the latter has been opened, the mixture of granules 10, 11 and raw material 16, 17 can now be blown into a mould cavity 28 of a mould 29 which consists of a lower mould part 30 and an upper mould part 31.

The control of the supply of the granules 10, 11 which are coated with the liquid raw material can also take place via a control valve 32, for example a stopper 23, which can also be controlled by a control system 14 in the same manner as the conveying blower 26.

In all or some of the individual mould surfaces 33 to 36, admission openings or ventilation openings 37 can be arranged, at least in the mould surface 36 opposite the inlet-opening, which connects the mould cavity 28 with ambient air, or, as schematically indicated, with an exhaust pipe 38.

Into the exhaust pipe 38 runs a feeder 40 also via a control valve 39, which is activated by the control system 14, by means of which for example water vapour, preferably dry steam at a temperature of 160° C. to 180° C., or another reaction means, for example of a heat exchanger 41 or a steam station is fed into the exhaust pipe 38. This takes place for example in that the exhaust pipe 38 is closed by a stop valve 42, which is activated by the control system 14, whereupon between this stop valve 42 and the mould cavity 28 this reaction means or vapour is introduced by the feeder 40 and after it flowed through the mould cavity 28, can flow out of the ventilation openings 37 which are not closed. Not only the air brought into the mould cavity 28 through these ventilation openings 37 during the introduction of the granules 10, 11 according to the schematically indicated arrows 43, can be removed but the water vapour, also indicated schematically by an arrow 44, can be introduced into the mould cavity 28 and also removed therefrom.

FIGS. 2 to 6 show the mould 29 in a simplified, diagrammatic representation but proportionally enlarged.

Thus, it can be seen from this illustration that the granules 10, 11 can be introduced by a supply line 45 into the mould cavity 28, and in this case, the ventilation openings 37 are arranged on the sidewalls parallel to the region of the mould surfaces 34 and 46, so that the air coming in with the mixture of granules 10, 11 can flow out into the open through these ventilation openings 37 or into the exhaust pipes described by way of example in FIG. 1.

Figure 3:
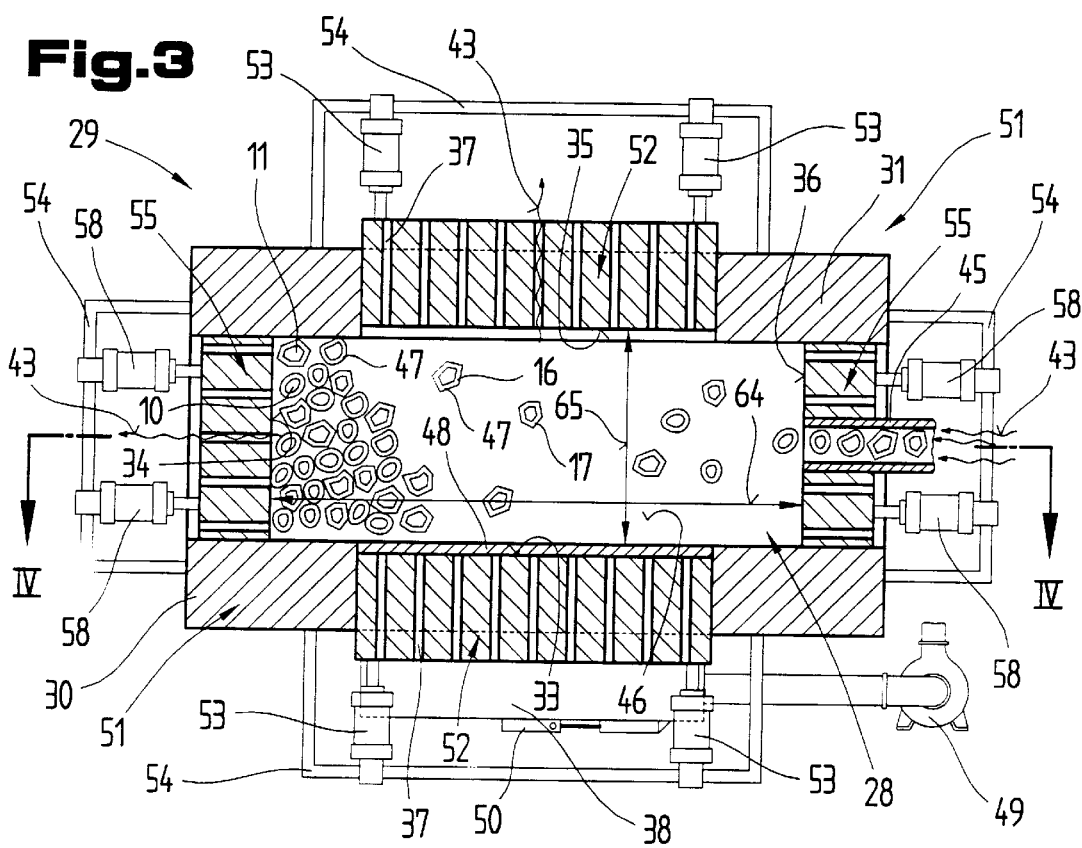
FIG. 3 shows the mould according to FIG. 2, in a front view, in a section taken along the lines III-III in FIG. 2 and in a simplified, diagrammatic representation with a covering layer introduced into the mould and an inner chamber partially filled with granules of synthetic material.

As can be seen better from the representation in FIG. 3, the granules 10, 11 are pulled into the mould cavity 28 by the air flow indicated by the arrows 43, and are deposited therein or on the mould surfaces 34 to 36 and 46, as schematically indicated. It can be seen further from the representation that each of the granules 10, 11 is coated with a surrounding coating 47 of the mixture of raw materials 16, 17 which is still liquid to form the plastic foam.

Generally, between 70 and 90%, preferably 85% of the volume of the shaped part 2 to be produced consists of granules 10, 11 of plastic foam from raw material 16, 17. 10 to 20% of the weight of the shaped part 2 are formed by the plastic foam of primary material or raw material 16, 17. The granules 10, 11 of plastic foam 7, 8 have in general a specific gravity of between 20 kg/m$^3$ and 250 kg/m$^3$, preferably 50 to 150 kg/m$^3$. The specific gravity of the plastic foam which has been produced from raw material 16, 17 is of between 800 kg/m$^3$ and 1200 kg/m$^3$ whereby the latter is preferably half stiff or half hard.

Furthermore, FIG. 3 also shows that before the granules 10, 11 are introduced, for example onto the mould surface 33, i.e. the floor of the mould 29, a covering layer 48, for example a batt or knitted material, fabric, lattice, net of natural or synthetic fibres, can be inserted preferably into a deepened part of the mould surface.

In this case, also when the ventilation openings 37 are triggered separately in the region of the individual mould surfaces 33 to 36 and 46 it is possible to use these ventilation openings 37 by applying a vacuum, for example by means of a vacuum pump 49 and by flaps 50 which can be controlled separately from the control system, in order to hold the covering layer 48 tightly. The vacuum pump 49 which is connected to the exhaust pipe 38 is also shown schematically in FIG. 1.

In particular if the covering layer 48 is permeable to air, a portion of the conveying air can be simultaneously sucked up by the vacuum pump 49 or otherwise, can flow through the remaining ventilation openings 37 according to arrows 43 out of the mould cavity 28.

When the mould cavity 28 is filled with granules 10, 11 in a uniform manner from the back towards the front, the conveying blower 26 is switched off and the supply line 45 is closed by means of the stopper 23, if required, the conveying blower 26 of the mould 29 can be uncoupled, in particular if said mould is arranged on a turntable or on a conveyer for loading of different work stations.

It is essential for the present method or manufacture of the shaped part 2 that the volume of the mould cavity 28 is about 10 to 50%, preferably 20% to 30% larger than the volume of the finished shaped part 2. This general precompression of the shaped part 2 occurs in such a way that the individual mould surfaces 33 to 36 and 46 depending on the various shaped parts 2 to be produced, are displaced into different positions from their initial position, either individually on different individually differing mould surfaces 33 to 36 and 46 or on all of them.

Thereby, the individual mould surfaces 33 to 36 and 46 can consist of several parts. In the present examples of an embodiment in FIGS. 3 to 6 only the mould surfaces 33, 35 and 46 are designed in several parts.

This way, the mould surface 33 consists of a surrounding mould ring 51 and an adjustable central part 52, which, as indicated schematically, can be activated by an adjustment drive 53, for example a pneumatic or hydraulic cylinder, which, as indicated schematically, can be supported by a mould frame 54, by triggering a control system 14 or energy sources activated by the latter, such as compressed-air compressors or hydraulic pumps. The same way, the mould surface 35 consists also of a surrounding mould ring 51 and a central part 52, which can be adjusted in the same way, which is also adjustable via a schematically indicated adjustment drive 53 with respect to the mould ring 51, which in the same way as the mould ring 51 of the mould surface 33 is held in a mould frame 54. The mould surfaces 46, on the other hand, are constructed in one piece and the mould surface 34 is also composed of a central part 55 and two lateral parts 56 and 57, as can be better seen from the representation in FIG. 6, whereby the lateral parts stand permanently in the mould frame 54 and the central part, as can be seen from FIG. 3, is adjustable with respect to the other mould elements by means of an adjustment drive 58.

Figure 4:
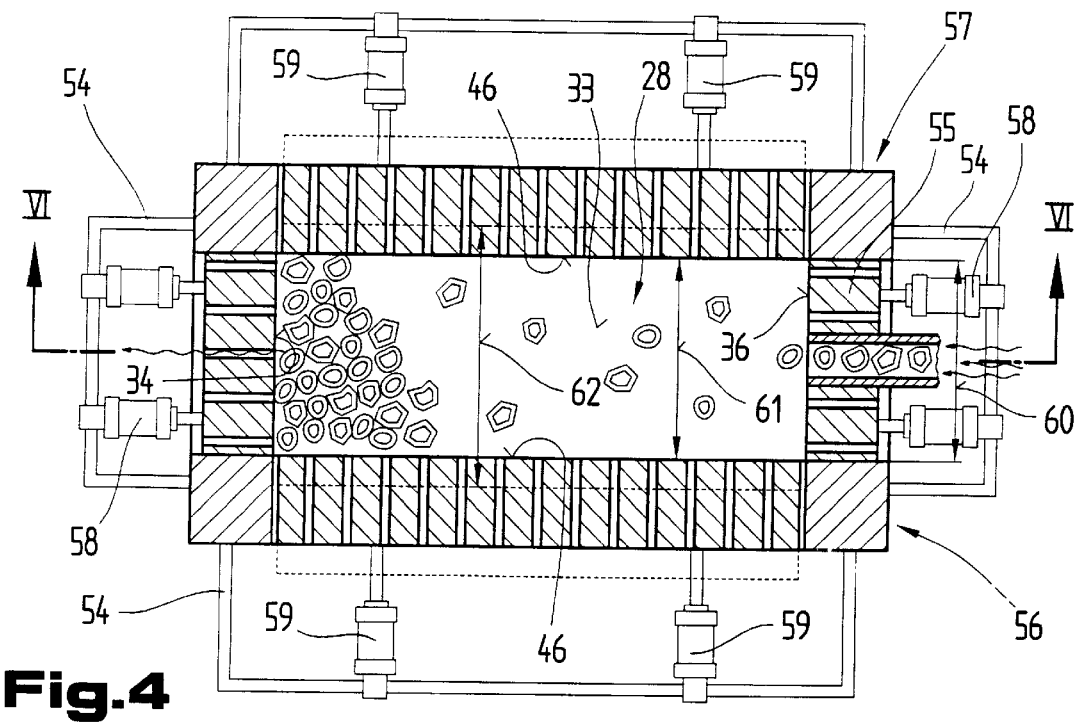
FIG. 4 shows the mould according to FIGS. 2 or 3, with form surfaces adjusted for pre-compression of the shaped part, in side view, in section and in a simplified, diagrammatic representation.
Figure 5:
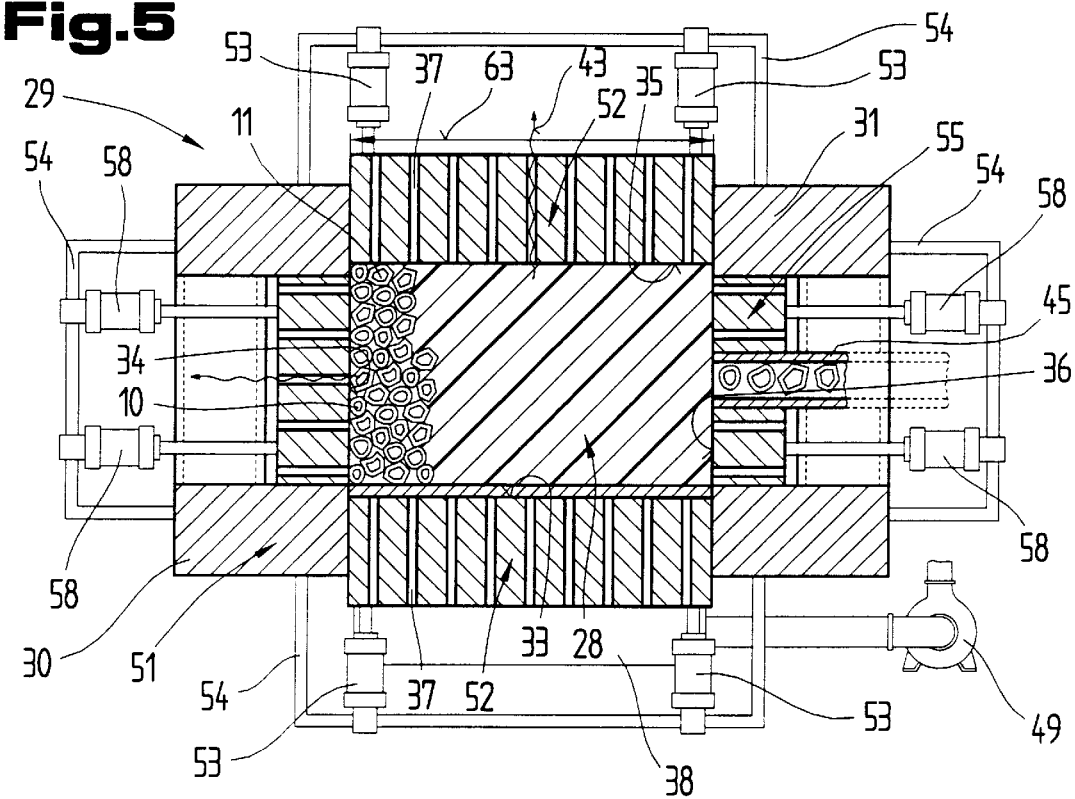
FIG. 5 shows the mould according to FIGS. 2 to 4 with further mould surfaces adjusted for the pre-compression of the shaped part, in front view, in section and in a simplified, diagrammatic representation.

As it is apparent from the course of processes shown in FIGS. 3 to 5, the mould surfaces 46 with the adjustment drives 59 associated therewith, are displaced from their initial position drawn in FIG. 5 by broken lines, which corresponds to the position in FIG. 3, into the compressed adjustment position, drawn in full lines. A distance 60 between these two mould surfaces 46 which are mutually opposed, corresponds precisely to a width 61 of the central part 52 of the mould surface 33 exactly parallel to the distance 60.

Depending on the ratio between an initial width 62 and the distance 60, a different compression ratio or a different compression of the granules 10, 11 or the granulate which are arranged in the mould cavity 2 and are still coated with liquid plastic is achieved.

After this compression process, as shown in FIG. 4, the central part 55 of the mould surface 34 is displaced from the position shown by broken lines in FIG. 4 and by full lines in FIG. 3, into a compressed position which is now shown in FIG. 4, by means of the adjustment drive 58. At the same time the mould surface 36 or a central part 55 equivalent to the mould surface 34 can be adjusted after an appropriate decoupling of the supply line 45 from the conveying blower 26, from a position shown in full lines in FIG. 3. into a compressed position drawn in full lines in FIG. 4. By the displacement of these central parts 55 relative to the mould surfaces 46, which have been transported together, a length 63 of the shaped part 2 is now reduced to a predetermined length of the central parts 52 of the mould surfaces 33 and 35. Due to the difference between the initial length 64 of the mould cavity 28 between the mould surfaces 34 and 36 and the finished length 63 a further compression factor of the shaped part 2 is also established.

Figure 6:
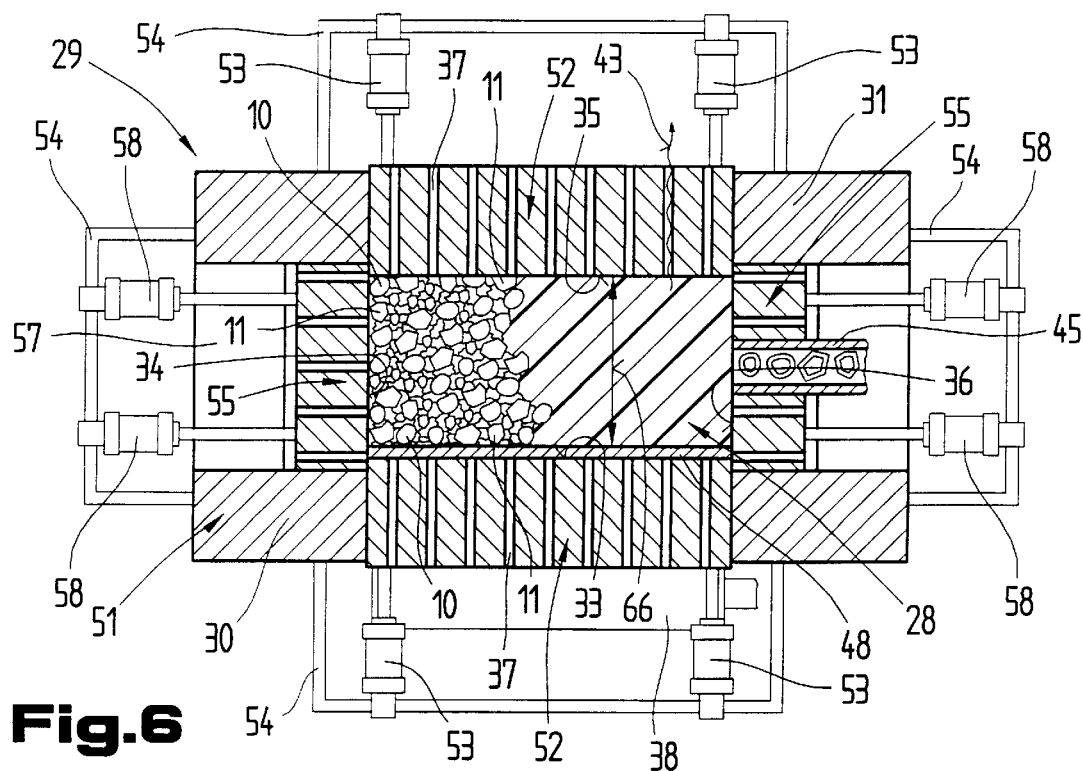
FIG. 6 shows the final pre-compressed shaped part in the mould according to FIGS. 2 to 5 and after reaction of the liquid synthetic material in a simplified, diagrammatic representation.

Finally, as can be seen from FIG. 6, the further compression of the non-solidified shaped body, i.e. of the granules 10, 11 which can still be moved relatively towards each other with their coating 47, can achieve an intial height 65 of the mould cavity 28 to a height 66 by transporting together the central parts 52 of the mould surfaces 33 and 35.

With this final adjustnent process the article-specific compaction process is terminated. The original volume is reduced by these supply or adjustment steps of the individual mould surface parts or the central parts 52, 55 and the mould surfaces 46 for the desired percentage of about 10 to 50%.

Thereby, it is to be noted that an average weight of the shaped parts 2 is between 20 kg and 300 kg. The adjustment occurs by means of adjustment drives, which can be constituted by hydraulic or pneumatic cylinders as described hereabove. The sequence of the displacement of the individual mould surfaces or mould surface parts, such as the central parts 52 or 55 and the mould surfaces 46, have been explained only by way of example in FIGS. 3 to 6. The successive movements of the individual mould surfaces or their central parts or other shaped parts, can be set differently depending on the article or the final hardness achieved or the like in each single shaped part 2. It is also possible that the lifting or adjustment paths of the individual mould surfaces or mould surface parts or the central parts of the latter, can take place at different sizes so that in different three-dimensional directions of the shaped part 2 different compression values can be achieved, for example through compressions in vertical direction only 15% of the volume and by compression in the longitudinal direction of the component 30% of the volume or by compression in the direction of the width a reduction in volume of about 35%.

After this article-specific precompression, the covering layer 48, which extended initially only over a portion of the initial length 64 and the initial width 62 of the mould surface 33 for example, covers now a surface of the shaped part 2 over its entire face as can be seen from FIG. 6.

Thereafter, as already described schematically in FIG. 1, the reaction fluid, for example vapour with a temperature of 160° C. to 180° C., in particular dry steam is fed into the mould cavity 28 through ventilation openings 37 or openings which are arranged especially for this purpose. These reaction fluids, in particular vapour or a solvent introduces the reaction of the liquid coating 47 or the synthetic material, and this liquid raw material foams up due to an appropriate gas formation and the development of a cell structure of open and/or half open and/or closed cells between the individual granules 10, 11 for example, as indicated schematically in FIG. 6.

This way, the initially loose granules 10, 11 are integrated into a soft, medium or hard cell structure depending on the desired strength based on the raw material used, and this leads to a strenghtened shaped part 2 having the desired thickness and hardness.

After the reaction of the coating 47 and the development of a corresponding cell structure in the shaped part 2, the mould 29 can be conveyed to a drying station, especially if the mould is moved along a mould path in cycles, for example by means of a turntable, whereby hot, dry air is guided through the ventilation openings 37 for example, in order to dry the shaped part after its reaction.

After the shaped part 2 has been sufficiently dried, the corresponding supply openings for this dry air are closed and the mould 29 can be opened and the shaped part 2 can be removed.

Of course, within the scope of the present invention it is also possible to carry out the individual working steps manually, half or fully automatic or to control these steps semi-automatically or automatically by means of an overall control system using a control system 14.

Instead of the mould surfaces 33 to 36 and 46 which consist of several parts, mould surfaces with a plurality of individual mould punches can be used for example in order to achieve a rapid adaptation of the mould for the production of different shaped parts. The surface or the mould cavity 28 as well as the subsequent individual compression processes can be preprogrammed for the production of the respective articles in an all-automatic manner by an appropriate control programmed.

Hence, it is furthermore also possible that the central parts 52 of the mould surfaces 33 or 35 can be provided with any three-dimensional shape on a surface facing towards the mould cavity 28. If this is not favourable for precompression, it is also possible to use first a plane-surfaced central part 52 to precompress the granules 10, 11 and to replace it by a central part 52 with a particular three-dimensional shape before the reaction process or the reaction of the coating 47 or the synthetic material starts, in order to give the shaped part 2 a required spatial deformation during the production process. The short opening and closing can also be used to apply covering layers directly to one or several surfaces of the shaped part 2, as it is indicated schematically by way of example of the covering layer 48 covering layers directly onto the shaped part 2 during the production process on one or several of the surfaces of the shaped part 2, as it is indicated schematically by means of the covering layer 48.

Depending on the raw material 16, 17 to be used which in general is a polyurethane, polyether or polyester foam, which can be adjusted to be soft, medium or hard, a close or open cell structure is formed in which the individual granules 10, 11 are embedded thereafter.

The advantage of this solution lies in particular in the fact that due to the supply of the granules 10, 11 by the air stream into a closed mould cavity 28 based on the regular flowing away of the air, a uniform complete filling of the mould cavity 28 is achieved whereby a tighter packing together of the granules 10, 11 which are elastic and can be deformed under weight load, is eliminated. Since the granules are keeping their balance during the filling of the mould cavity 28 due to the air stream which is constantly passing through, according to arrows 43, and after the air stream is switched off, due to the raw material of the coating 47 adhere loosely to one another, a production of shaped parts 2 is created also during a series production with a high repetition phase sequence number, which, over its entire cross-section allows for an average specific gravity and uniform distribution of the granules 10, 11, in particular also of the various recycling materials with different specific gravities or coating parts.

Based on the preceeding mixture of the granules 10, 11 from the receptacles 3, 4 and the filling weight of the mould cavity 28 which can be predetermined in the intermediate storage tank 20, the basic density being achieved can also be preselected, whereby, if required, it can be additionally influenced by the air stream or the air pressure procuded in the mould cavity 28 by the air stream. When the filling with the granules 10, 11 in the mould cavity 28 increases, the pressure produces a greater resistance against the air flowing through, and depending on the preselected degree of pressure of the conveying air, an equivalent density can be created in the granules 10, 11 which are located loosely in the mould cavity 28, or in the preformed blank part.

Figure 7:
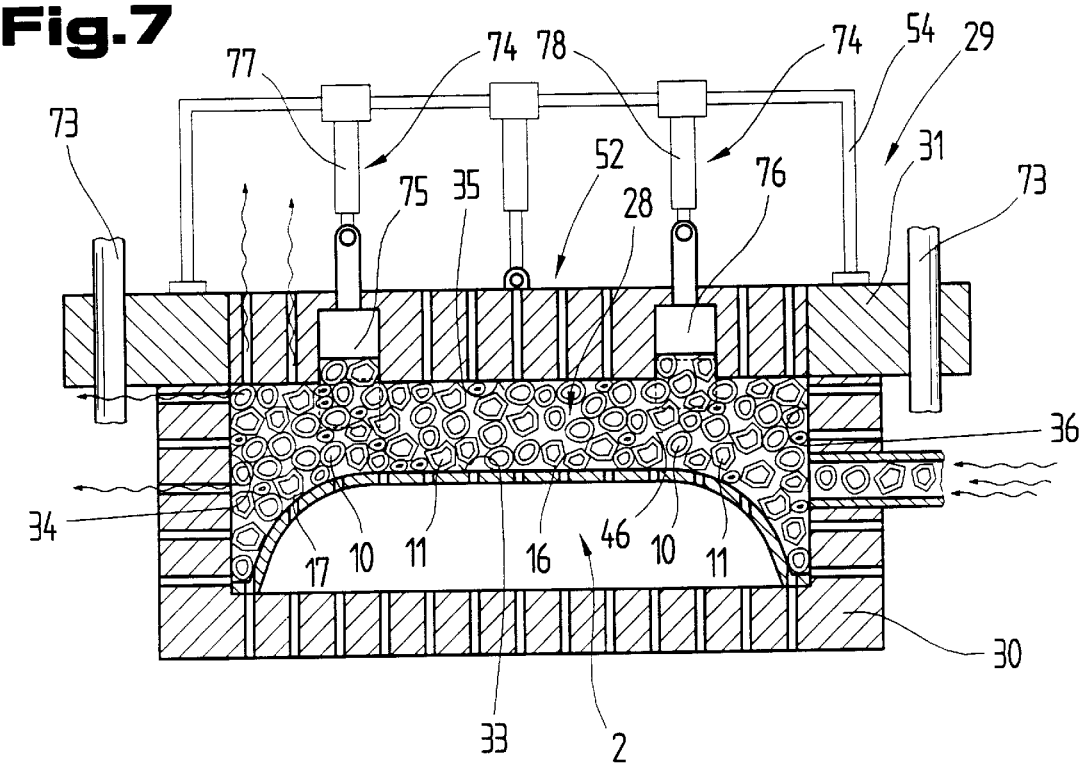
FIG. 7 shows another embodiment of a mould for a shaped part according to the invention, in side view, in section and in a simplified, diagrammatic representation.
Figure 8:
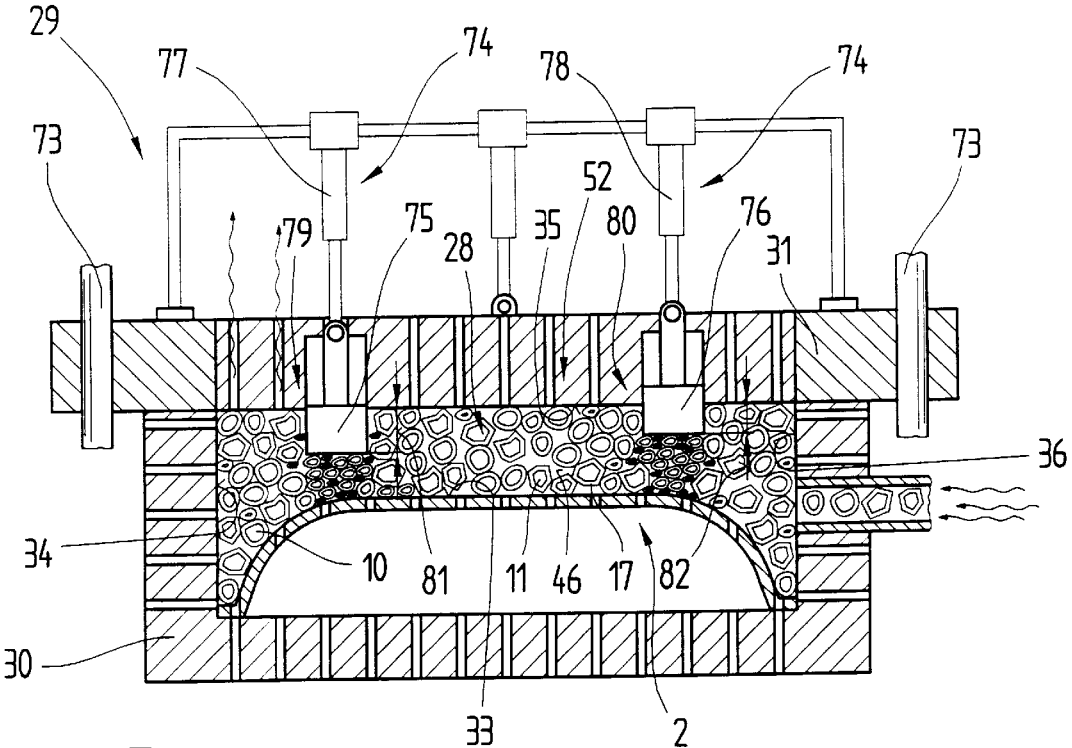
FIG. 8 shows the mould according to FIG. 7 with granules of foamed plastic compressed to a different degree in different areas.

In addition, FIGS. 7 to 9 show that the mould cavity 28 can also be used to produce spatially curved shaped parts 2 as it is shown for example in FIG. 9.

As can be seen further from the representation of the shaped part 2 in FIG. 9, the latter can also be provided with deepened recesses 71, 72.

As illustrated in the moulds used, it is now simultaneously possible by means of a general precompression of the shaped part 2 based on the displacement of a central part 52 of the mould surface 35, to increase the density in the shaped part in the cross-sectional regions in which the recesses 71, 72 are arranged in the shaped part 2.

This occurs in such a way that in the mould surface 35, for example along guide rods 73 by means of adjustment drives 74, for example piston-cylinder arrangements activated by a fluid for example, adjustable mould inserts 75, 76, which by means of setting drives 77, 78 shown in full lines in FIG. 7 are displaceable into a position shown in full lines in FIG. 8.

This way, as can be seen from the different density of the schematically indicated granules 10, 11 in FIGS. 7 and 8, the mould cavity 28 is enlarged whilst the granules 10, 11 which are coated with the raw material 16, 17 are blown in and in the entire mould cavity a filling with identical density is achieved.

In order to achieve in the regions 79, 80 of the shaped part 2 a higher density of the granules 10, 11 and also of the foam structure of raw material 16, 17 situated therebetween, in addition to the general precompression of the granules 10, 11 as it is achieved by the adjustment of the central part 52 of the mould surface 35 by means of the adjustment drive 53, or independently thereof the mould insert 75 and/or 76 can be adjusted by means of setting drives 77, 78 from a rest position or filling position for the mould cavity 28 drawn in full lines in FIG. 7 into the compression position shown in FIG. 7 by broken lines and drawn in FIG. 8 in full lines.

As it is indicated schematically in FIG. 8 by a tighter layer of the granules 10, 11, the density is thereby increased in the regions 79, 80 of the mould cavity 28 corresponding to the respective insertion depth 81 or 82 which, during the subsequent reaction of the liquid raw material 16, 17 based on the higher density results in an increasingly strenghtened zone in the shaped part 2.

This has for example the advantage, that in this region, fastening elements can be arranged by means of which the shaped part 2, when used as noise insulating mat or inner lining in a vehicle, can be fixed to the body.

The compression can also be arranged to provide the shaped part 2 in its entirety based on the forming with a higher stiffness or strength.

It is, of course also possible, if in this region, in which the recesses 71 and 72 are provided, no greater density of the shaped part 2 is required, that the mould inserts 75, 76 can already be displaced before the granules 10, 11 are blow in, into a position shown by broken lines in FIG. 7. This leads to the development of a shaped part 2 in which recesses 71, 72 are arranged but this shaped part 2 has then over its entire cross-section an average identical density.

The average, identical density can be found or compared as follows:

The weight of a cross-sectional piece 83—as shown in FIG. 9—is determined by a thickness 84 and calculated from the volume and the existing weight, which volume this cross-sectional piece 83 would have at a predefined reference specific gravity.

Thereafter, the weight of a further cross-sectional piece 85 having preferably the same thickness 84 is determined, and also from the resulting data, the volume is established for the reference specific gravity used for calculation. The values of volumes, which have been established in this way, refer to an identical reference specific gravity, which is then referred back to a given reference volume, and an identical average density and/or specific gravity is provided if the resulting specific gravity of the reference volume or the density is the same, or not deviating more than +/−15%, preferably +/−7, 5% from one another.

Thereby, it is understood that a comparison of specific gravities refers to the ratios as they occur during the blowing in of the granules 10, 11 into the mould cavity 28, whereby a larger volume of the mould cavity 28 is created by pulling back the mould inserts 75, 76 or the mould surfaces 33 to 36 and 46 which is filled with granules 10, 11 of identical density.

The higher compression schematically indicated and shown in FIG. 6 in the regions 79 and 80 of the shaped part 2 is only achieved in that the initially introduced granules 10, 11 with identical density are partially more compacted by a deliberate volume reduction which of course, also increases the specific gravity removal of due to the reduced volume. Of course, in this variant of an embodiment, it is also possible not only in the direction of the mould surface 35, but also in the direction of the other mould surfaces 33, 34, 36 and 46 to carry out a precompression. The same way, it is also possible to arrange additional adjustable mould inserts 75 and 76 of any type and configuration, also in the other mould surfaces 33, 34 or 36 and 46.

For good order's sake it must be noted at this point, that each of the examples of an embodiment shown or feature combinations characterized in the claims can form their own solution in accordance with the invention. In addition, individual features of the individual examples of an embodiment which are combined with one another in any composition, can also form the object of own solutions according to the invention.

For a better understanding of the effect of the method and the structure of the shaped part 2, individual layers and coatings of the granules 10, 11, the granules themselves or the shaped part 2 is unproportionally enlarged and distorted or greatly exaggerated. The same applies also for devices and moulds for the production of such shaped parts, which are mostly shown in a simplified and diagrammatic representation.

As moulding material for the moulds 29, metal alloys especially of epoxy resin or resin-fed, such as moulds cast of aluminium, milled out or in the form by aluminum plates, as well as of stainless steel or iron plates, can be used for the production of the moulds.

Finally, it must be pointed out that an advantage during the production of the shaped parts 2 of recycling material is achieved by the above described way of processing, in that the old recycling materials at the time when the hardening or reaction of the raw material 16, 17 occurs by means of a hot vapor or hot air, which, can also be soiled, are sterilized by the high temperatures and thereby eliminate any undesired fungus, germs or the like.

In particular, the individual embodiments shown in FIGS. 1; 2–6; 7, 8; 9 can form the object of own solutions according to the invention. Relating tasks and solutions are apparent from the detailed descriptions of these figures.

What is claimed is:

1. A three-dimensional shaped part having a predetermined volume and comprising
   (a) at least one first portion having an equal density throughout the volume thereof and comprising
      (1) a plastic foam of a primary material having a cellular structure and
      (2) plastic foam granules interconnected by the cellular structure of the plastic foam, and
   (b) at least one second portion having an equal density throughout the volume thereof, the second portion being adjacent the first portion and comprising
      (1) a plastic foam of a primary material having a cellular structure and
      (2) elastically nonthermally precompressed plastic foam granules interconnected by the cellular structure of the plastic foam, and
      (3) the density of the second portion being greater than the density of the first portion, and
   (c) 70% to 90% of the volume of the shaped part being formed by the plastic foam granules.

2. The shaped part of claim 1, wherein the portions extend along one of the dimensions of the three-dimensional shaped part, the one dimension defining the thickness of the shaped part, and the average density of said portions is between 25 kg/cu.m. and 1000 kg/cu.m.

3. The shaped part of claim 1, wherein the portions extend along one of the dimensions of the three-dimensional shaped part, the one dimension defining the thickness of the shaped part, and a predetermined volume of the portions is a fraction of less than $10^{-6}$ of the volume of the shaped part.

4. The shaped part of claim 1, wherein the portions extend along one of the dimensions of the three-dimensional shaped part, the one dimension defining the thickness of the shaped part, portions having different widths having different initial volumes, the second portion having a larger initial volume at the same volume of the portions.

5. The shaped part of claim 1, wherein the shaped part is formed in one piece.

6. The shaped part of claim 1, wherein the first and second portions are sections extending along one of the dimensions of the three-dimensional shaped part, the one dimension defining the thickness of the shaped part, adjacent ones of the sections of the same thickness having different densities.

7. The shaped part of claim 1, wherein the plastic foam granules have a density of between 20 kg/cu.m. and 250 kg/cu.m.

8. The shaped part of claim 1, wherein the plastic foam of the primary material forms 10% to 20% of the shaped part.

9. The shaped part of claim 1, wherein the plastic foam of the primary material has a density of 800 kg/cu.m. to 1200 kg/cu.m.

10. The shaped part of claim 1, wherein the primary material is polyurethane.

11. The shaped part of claim 1, wherein the plastic foam of a primary material having a cellular structure is a soft plastic foam.

12. The shaped part of claim 1, wherein the proportion of the primary material in relation to the volume thereof is higher in the second portion than in the adjacent first portion.

13. The shaped part of claim 1, wherein the granules have a grain size between 2 mm and 20 mm.

14. The shaped part of claim 1, wherein the granules are embedded in the cellular structure in a predetermined three-dimensional shape.

15. The shaped part of claim 1, comprising a covering layer bonded to a surface area of the shaped part.

16. The shaped part of claim 1, wherein granules of different hardness are interconnected by the cellular structure.

17. The shaped part of claim 1, wherein the granules are comprised of plastic foam waste.

18. The shaped part of claim 17, wherein the granules of plastic foam waste have a surface coating.

19. The shaped part of claim 1, further comprising fibers of thermoplastic plastic waste incorporated in the cellular structure.

20. The shaped part of claim 1, wherein the second portion extends along one of the dimensions of the three-dimensional shaped part, the one dimension defining the thickness of the shaped part, and the density of said second portion differs from the density of the first portion by a predetermined compression factor.

21. The shaped part of claim 1, further comprising a granulated additive selected from the group consisting of cork, rubber and a mixture thereof incorporated in the cellular structure.

22. The shaped part of claim 1, further comprising reinforcement elements incorporated in the cellular structure.

* * * * *